United States Patent [19]
Devine et al.

[11] Patent Number: 5,490,997
[45] Date of Patent: Feb. 13, 1996

[54] EDIBLE FIBER-CONTAINING PRODUCT AND COMPOSITION

[75] Inventors: Denise L. Devine, Moylan; Sheila M. Katz, Gladwyne, both of Pa.; Peter M. Salmon; M. Lynne Sweet, both of Ithaca, N.Y.

[73] Assignee: Devine Foods, Inc., Media, Pa.

[21] Appl. No.: 423,608

[22] Filed: Apr. 17, 1995

Related U.S. Application Data

[60] Continuation of Ser. No. 89,148, Jul. 8, 1993, Pat. No. 5,407,694, which is a division of Ser. No. 769,412, Oct. 1, 1991, Pat. No. 5,234,704.

[51] Int. Cl.⁶ ............................................. A23L 2/02
[52] U.S. Cl. .................. 426/573; 426/579; 426/590; 426/599; 426/615; 426/639; 426/658
[58] Field of Search ............................ 426/573, 590, 426/599, 579, 615, 639, 658

[56] References Cited

U.S. PATENT DOCUMENTS

| | | | |
|---|---|---|---|
| 1,631,830 | 11/1926 | Negly et al. | 426/590 |
| 1,956,427 | 4/1934 | McKinnis | 426/596 |
| 3,579,352 | 5/1971 | Bookwalter et al. | 426/590 |
| 3,615,674 | 10/1971 | Bass et al. | 426/618 |
| 4,198,400 | 4/1980 | Biegler | 426/589 |
| 4,681,770 | 7/1987 | Palmer | 426/615 |
| 4,834,990 | 5/1989 | Amer | 426/599 |
| 4,986,994 | 1/1991 | Baccus, Jr. | 426/590 |
| 4,988,530 | 1/1991 | Hoersten et al. | 426/590 |
| 5,069,924 | 12/1991 | Baccus, Jr. | 426/590 |
| 5,108,774 | 4/1992 | Mills et al. | 426/590 |
| 5,118,510 | 6/1992 | Kuhrts | 426/590 |
| 5,213,834 | 5/1993 | Ikeda et al. | 426/573 |
| 5,234,704 | 8/1993 | Devine et al. | 426/565 |

FOREIGN PATENT DOCUMENTS

| | | |
|---|---|---|
| 5674290 | 7/1993 | Australia. |
| 0349235A2 | 1/1990 | European Pat. Off.. |
| 0396214A3 | 4/1990 | European Pat. Off.. |
| 0414011A2 | 2/1991 | European Pat. Off.. |

*Primary Examiner*—Jeanette Hunter
*Attorney, Agent, or Firm*—Panitch Schwarze Jacobs & Nadel

[57] ABSTRACT

The present invention is directed to a fiber-containing edible product and a method of making such a product. The edible product contains microparticulated fiber derived from a fiber source preferably having an insoluble fiber content of at least about 2.5%, hydrocolloid in an amount sufficient to maintain the fiber in suspension when the product is mixed with liquid to make an edible composition, and, except where a pudding-like consistency is desired, potable acid in an amount sufficient to lower the pH of the edible composition to a pH sufficient to avoid gelatinization of the composition. The edible product preferably contains sweetener and additional natural flavoring. The method of making fiber-containing edible product comprises adding to a volume of liquid less than the total predetermined volume finely ground fiber to create a mixture, hydrating the fiber, adding additional liquid and hydrocolloid, treating the mixture to create microparticulated fiber, hydrate the hydrocolloid and create a homogenized mixture and acidifying the mixture to a pH sufficient to avoid gelatinization of the mixture.

32 Claims, No Drawings

5,490,997

EDIBLE FIBER-CONTAINING PRODUCT AND COMPOSITION

CROSS-REFERENCE TO RELATED APPLICATIONS

This application is a continuation of U.S. patent application Ser. No. 08/089,148, filed Jul. 8, 1993, now U.S. Pat. 5,407,694, which was a division of U.S. patent application Ser. No. 07/769,412, filed Oct. 1, 1991, now U.S. Pat. No. 5,234,704.

FIELD OF THE INVENTION

The present invention relates to a nutritive composition containing microparticulated fiber and a method for making the same. More particularly, the present invention is directed to a water-based edible composition containing a plurality of fiber sources, preferably grains having a significant insoluble fiber content.

BACKGROUND OF THE INVENTION

People have become increasingly aware of the benefits of dietary fiber in nutrition. The average American diet contains about 12 grams of dietary fiber per day. A food contributing more than about 0.6 gram of dietary fiber per serving is generally considered a significant source of dietary fiber. The search for alternative sources of dietary fiber has also become increasingly popular. One alternative source for dietary fiber intake is liquid beverages. However, typical dietary fiber-containing beverages include cereal grains, such as bran, which are generally recognized as breakfast foods that must be prepared and consumed relatively quickly before the cereal grain becomes soggy and unpalatable. Other attempts to provide beverages containing dietary fiber include the so-called instant meals which frequently take the form of a milkshake-like beverage. However, these beverages are considered generally undesirable to the extent that the ingredients separate into solid and liquid components shortly after they are mixed, they contain artificial ingredients and they are not particularly palatable. Still other attempts in the prior art to provide a beverage containing dietary fiber include simple mixing of wheat germ or bran, for example, in common beverages, such as water and fruit juice. However, these beverages must be prepared and consumed immediately before the fiber settles to the bottom of the beverage and they are not considered to be very palatable. In virtually all conventional fiber or grain-containing preparations, the product is gritty or chalky in texture and/or is exceedingly viscous and pasty.

The present invention is directed toward satisfying the demand for wholesome, palatable and nutritious food products. More specifically, the present invention yields products providing a significant contribution of dietary fiber, particularly insoluble dietary fiber, and preferably derived from whole grains, most preferably organically grown whole grains. The inventors believe that they are the first to provide such an edible product comprising stably suspended grains or other fibers with such a high level of insoluble fiber, and particularly in a beverage. Compositions derived from the food product of this invention have a good, appetizing visual appearance, fostering an acceptance of the compositions by consumers of all ages. Because the product and compositions of the present invention are palatable and visually appealing, consumers who consume the compositions for that sensory appeal will naturally and readily reap the health benefits associated with high fiber dietary products.

SUMMARY OF THE INVENTION

One aspect of the present invention relates to an edible product comprising microparticulated dietary fiber derived from a fiber source having an insoluble fiber content of at least about 2.5% by weight of the dietary fiber source and hydrocolloid in an amount sufficient to maintain the fiber in suspension when the edible product is mixed with a liquid to make an edible composition.

Another aspect of the present invention relates to an edible product comprising microparticulated dietary fiber derived from a fiber source having an insoluble fiber content of at least about 2.5% of the dietary fiber source, hydrocolloid in an amount sufficient to maintain the fiber in suspension when the edible product is mixed with a liquid to make an edible composition, and potable acid in an amount sufficient to adjust the pH of the edible composition to a pH sufficient to avoid gelatinization of the edible composition.

Preferably, fruit juice and/or vegetable juice and a sweetener are added to the edible product and/or composition, along with any desired flavoring agents, to make a healthy, tasty, edible composition with good, smooth mouth feel.

In addition, the present invention is directed to a method for preparing a fiber-containing edible product comprising:
(a) adding to liquid having a volume of less than a total predetermined volume of the edible product a finely ground edible fiber to create a mixture;
(b) substantially fully hydrating the fiber;
(c) adding sufficient liquid to the mixture to make a first diluted mixture of a pumpable consistency;
(d) adding hydrocolloid in an amount sufficient to suspend the hydrated fiber in the first diluted mixture when the first diluted mixture is further diluted to form a second, more diluted mixture of predetermined consistency;
(e) treating the mixture to create microparticulated fiber within the first diluted mixture and to substantially completely hydrate the hydrocolloid and create a homogenized mixture; and
(f) acidifying the first diluted mixture to a pH sufficient to avoid gelatinization of the first diluted mixture.

Another method according to the present invention for preparing a fiber-containing edible product having a pudding consistency comprises
(a) adding to liquid having a volume of less than a total predetermined volume of the edible product a finely ground edible fiber to create a mixture;
(b) substantially fully hydrating the fiber;
(c) adding sufficient liquid to the mixture to make a first diluted mixture of a pumpable consistency;
(d) adding hydrocolloid in an amount sufficient to suspend the hydrated fiber in the first diluted mixture when the first diluted mixture is further diluted to form a second, more diluted mixture of predetermined consistency; and
(e) treating the mixture to create microparticulated fiber within the first diluted mixture and to substantially completely hydrate the hydrocolloid and create a homogenized first diluted mixture.

DEFINITIONS

As used herein, the term "dietary fiber" refers to that part of plant material which is resistant to digestion by the secretions of the human gastrointestinal tract.

As used herein, the term "microparticulated fiber" refers to very finely ground dietary fiber having an average particle size of less than about 50 microns and typically about 10 to about 50 microns.

As used herein, "%" or "percent" refers to the weight percent of a particular ingredient in the completed composition for consumption or of the mixture being described, unless otherwise indicated or clear from the context of the description.

DETAILED DESCRIPTION OF THE PREFERRED EMBODIMENTS

In accordance with the present invention, an edible product contains microparticulated dietary fiber derived from a fiber source having an insoluble fiber content of about 2.5% by weight of the dietary fiber source, hydrocolloid and, except where gelatinization is desired (discussed below), potable acid. The edible product may be provided as a partially or completely dehydrated mix to which liquid can be added to form an edible composition, such as a liquid beverage, a frozen confection or a pudding, for example. Alternatively, the edible product may be provided as a liquid concentrate for subsequent liquid addition thereto to yield such edible compositions. The invention also includes the edible composition in its final, consumable form.

Although dietary fiber sources having less than about 2.5% insoluble fiber content may readily be used to prepare the product compositions of the present invention, because insoluble fiber is presently preferred for dietary reasons, the inventors believe that using fiber sources having such relatively smaller insoluble fiber content is economically undesirable.

To achieve a smoother texture in the edible compositions of this invention, which is generally more palatable and which yields a generally more homogeneous and readily suspended fiber/liquid composition using the method of the present invention, inhibiting settling of the dietary fiber in the edible product and compositions, the dietary fiber source preferably has a ratio of soluble fiber to insoluble fiber of no less than about 1:9.

The dietary fiber source used in the edible product of the present invention is preferred to be an organic whole grain or mixture of grains. Suitable grains include barley, brown rice, oats, corn or malts thereof, although in view of the present disclosure, one skilled in dietary science will readily appreciate that other grains are available and may be used in accordance with the present invention. A mixture of such grains is preferred to provide a more pleasing and palatable edible composition. The presently preferred mixture of grains is barley, brown rice and oats, optionally including corn. Although not critical, where the dietary fiber source comprises grains, it is also presently preferred to use the whole grain, as opposed to only the bran or only the kernel. Whole grain products currently have higher consumer appeal. Moreover, whole grains provide a higher dietary fiber content per weight of grain present in the edible compositions of the present invention.

As may be readily appreciated, especially the whole grain of any of the presently preferred grains may be relatively large, may have a high insoluble fiber component and may not be suitable for consumption in a beverage, frozen confection, pudding or other edible composition. Moreover, whole grains in an edible composition are not likely to be palatable or readily suspended in the composition.

Other sources of dietary fiber having a relatively high insoluble fiber content may be used, such as structural polysaccharides, including cellulose. Still other dietary fiber sources include vegetable fiber, and fruit fiber, including the insoluble pulp component from vegetables and fruits, which is often a waste by-product from juice processing operations. Where the dietary fiber source is vegetable fiber and/or fruit fiber, the vegetable fiber and/or fruit fiber should have an insoluble fiber content of at least about 25% by weight of the vegetable fiber and/or fruit fiber. Although various vegetables and/or fruits having the desired insoluble fiber component may be used as the source of dietary fiber in the present invention, it is presently not preferred to use oil seeds, such as cocoa or coffee seeds, or psyllium seeds.

The present invention also includes a mixture of sources of dietary fiber, depending upon the desired taste, texture, etc.

The dietary fiber used in the present invention is microparticulated during processing according to the present invention to provide a stable, edible composition having a pleasing and palatable texture, taste and appearance, while still providing the desired health benefits of high dietary fiber foods recognized by health professionals. Such health benefits are believed to include control of constipation and other digestive or intestinal conditions, and cardiovascular diseases, among others. The microparticulation also aids in maintaining the dietary fiber in suspension in the edible product and in the edible composition.

Dietary fiber is preferably present in the edible product of the present invention in an amount sufficient to yield at least about 0.025% insoluble fiber in the edible composition produced from the edible product. Depending on the amount of dietary fiber desired for intake and the consistency and texture of the beverage desired, one skilled in the art will appreciate in view of this disclosure that the grain content may be higher or lower.

At least one hydrocolloid is also present in the edible product of the present invention as a suspension agent for the microparticulated dietary fiber in the edible compositions derived from the edible product to provide more uniform and palatable compositions with better mouth feel and better eye appeal and good stability (where even the insoluble dietary fiber does not significantly and undesirably settle or separate out from the edible product or composition) over time, providing good shelf life for at least several months in aseptic packaging. Hydrocolloids suitable for use in the present invention include carrageenan, locust bean gum, cellulose gums, guar gum and pectin, although other hydrocolloids capable of maintaining microparticulated dietary fiber in relatively stable suspensions may be used. Carrageenan, locust bean gum, guar gum and pectin are particularly preferred because they are considered to be natural ingredients. The presently preferred hydrocolloid is carrageenan.

The hydrocolloid should be present in an amount sufficient to maintain the microparticulated dietary fibers in suspension when the edible product is mixed with a liquid to make an edible composition, but insufficient to create an excessively viscous, slippery or gummy texture. It is presently preferred that the hydrocolloid is present in an amount of about 0.1% to about 1.0% in the edible composition. Where the hydrocolloid comprises carrageenan, about 0.20% is presently preferred. In view of the present disclosure, one skilled in the art will appreciate that greater or lesser amounts of hydrocolloid may be present in the edible product depending on the amount of dietary fiber present, the viscosity of the edible compositions desired and the characteristics of the particular hydrocolloid.

The edible product according to the present invention also contains citric acid or other potable dilute acid, such as malic acid, phosphoric acid, lactic acid or fumeric acid, for example. The acid ingredient acts as a natural preservative, serves to lower the pH of the edible product and compositions and provides an often desirable tart taste to the edible compositions. The level of pH in the beverage has an impact on the ability of certain hydrocolloids, such as carrageenan, to gelatinize the edible product, which is generally not desired in accordance with the present invention, except where an edible composition having a pudding-like consistency is desired. The acid ingredient is preferably added in an amount sufficient to adjust the pH of the edible product to a level where gelatinization of edible compositions is avoided. Where the hydrocolloid comprises carrageenan and pudding compositions are not desired, for example, it is presently preferred that potable acid be added in an amount sufficient to adjust the pH of the edible composition to about 5.5 pH or less, and preferably to about 3.8, depending on the flavoring used. With regard to taste, one skilled in the art will appreciate that lowering the pH significantly below about 3.5 may be too acidic or tart for a palatable composition.

The edible product in accordance with the present invention optionally, but preferably, includes a sweetener. When present, it is preferred to use a natural sweetener, such as rice syrup or maple syrup, although one skilled in the art will appreciate that other natural sweeteners, such as sugars, including sucrose, glucose and fructose, as well as artificial or non-nutritive sweeteners, such as saccharine or aspartame, also may be used. Sweeteners preferably are present in the edible compositions in an amount of about 5% to about 20% and more preferably, from about 10% to about 15% in the edible compositions. For example, where rice syrup is used, it is preferably present in an amount sufficient to yield about 10.0% to about 13.5% in the edible compositions. Mixtures of syrups preferably are present in about the same range. For example, when the edible composition contains a mixture of rice syrup and maple syrup, the rice syrup is present in an amount of about 11%, while the maple syrup is present in an amount of about 2.5%. Based on the present disclosure, one skilled in the art would be able to adjust the amount of sweetener depending on its type and the other characteristics desired for the edible compositions set forth herein.

Another preferred ingredient in the edible product according to the present invention is fruit and/or vegetable juice, preferably from organically grown fruit or vegetables. Although single strength fruit or vegetable juice may be used in accordance with the present invention, because of cost and ease of processing, juice concentrate is presently preferred. The particular fruit or vegetable juice or combination of juices to be included in a particular edible product are based predominantly on the flavor and color of the product desired. Non-limiting examples of fruit juices which may be used in accordance with the present invention include apple, grape, cherry and pear fruit juices. Non-limiting examples of vegetable juices which may be used in accordance with the present invention include tomato, carrot, celery, spinach, pumpkin, beet, parsley, lettuce and watercress vegetable juices. One skilled in the art will understand that other fruit or vegetable juices or combination of juices may be used in accordance with the present invention. Preferably, the fruit and/or vegetable juice is present in an amount sufficient to flavor edible compositions derived from the edible product with fruit and/or vegetable juice flavor. It is preferred that the fruit and/or vegetable juice is present in the edible product in an amount sufficient to yield about 8% to about 50% fruit and/or vegetable juice in the edible composition, with about 10% to about 20% being particularly preferred.

In addition, it may be desired to add flavoring, preferably natural flavoring, to the edible product as desired for taste. Maple flavoring is a popular example and is one presently preferred flavor. Chocolate is another popular example of flavoring. Fruit flavor enhancers also are presently preferred. For example, it may be desired to provide one or more of apple, pear, peach, cherry, mixed berry, and grape flavoring ingredients in various forms, from fresh and frozen, preferably organic, whole fruit chunks to purees and the like, to enhance the taste of the edible compositions. Regardless of the form in which the fruit or other flavoring ingredients are added, these ingredients, as all of the ingredients of the edible product and compositions of the present invention, should be homogeneously blended into the edible product, unless a chunky fruit or other flavoring consistency is specifically desired. Thus, the sensory appeal and palatability of the edible compositions derived from the edible product are maintained.

The balance of the edible product, at least during processing, and the edible compositions in the present invention is liquid, preferably water, and more preferably filtered water, although other liquids, such as milk, for example, may be included where desired. Depending on the type of edible composition made using the edible product of the present invention, the edible composition generally comprises about 12% to about 55% of the edible product and about 45% to about 88% of the liquid, and preferably, about 15% to about 50% of the edible product and about 50% to about 85% of the liquid. Beverages would contain more liquid than other types of products, such as frozen confections, puddings or other products meant to be eaten with utensils, rather than drunk.

The edible product of the present invention is prepared by adding and blending the dietary fiber component into liquid, preferably water, having a volume preferably less than the total predetermined volume of the edible product, and preferably, about ⅓ of the total volume, to create a mixture of water and fiber. The fiber added to the liquid is preferably a finely ground dietary fiber source, typically ground to a particle size typical of wheat flour (generally an average size of about 500 microns) using any of a number of conventional grinders or mills. The mixture is conveniently blended or mixed using a low speed mixer (with a mixing speed of about 500 to about 1500 rpm), such as a Lightening mixer available from Lightnin Inc.

The mixture is heated to substantially fully hydrate the fiber, preferably by heating to a temperature and for a time sufficient to cook out (gelatinize) the fiber. Preferably, to cook out the fiber, the mixture is heated to about 120° F. (48.9° C.) to about 220° F. (104° C.), more preferably about 150° F. (65.6° C.) to about 170° F. (76.7° C.), for about 2 to about 20 minutes, until the fiber is substantially fully hydrated. One skilled in the food technology art would appreciate that the temperature and time required to obtain substantially full hydration is dependent on pressure, type of fiber and other factors readily empirically determined. Typically, full hydration at temperatures within the preferred range set forth above generally occurs in about ten minutes or when the viscosity of the mixture no longer increases, indicating substantially full hydration of the fiber. For example, where the dietary fiber in the mixture is derived from barley, brown rice, oats, corn and mixtures thereof, it is preferred to heat the mixture to a temperature of about 150° F. (65.6° C.) to about 160° F. (71.1° C.). Once the gelatinization temperature of the fiber is reached, the fiber component of the dietary fiber source softens, which enhances the smoothness of the edible composition. The heating step also assists in suspending the fiber in the edible composition.

After the fiber is substantially fully hydrated, additional liquid, preferably water, heated to about the temperature of the mixture is added to the mixture to make a first diluted mixture. The first diluted mixture should have a consistency which is not too viscous as to inhibit mixing and pumping through homogenizers (discussed below). Preferably, liquid is added to the mixture so that the first diluted mixture reaches a volume preferably greater than about 50% to less than about 80% of the total predetermined volume of the edible composition.

The first diluted mixture is then processed to create microparticulated fiber within the first diluted mixture, although this microparticulation may be done later after hydrocolloid is added. This processing is preferably conducted in a high shear mixer apparatus, such as an Omni Emulsifier available from Omni International, Inc. or more preferably, in a homogenizer, such as a Gaulin Homogenizer available from APV Gaulin Inc. It is believed that virtually any high shear emulsifier or homogenizer may be used in accordance with the method of the present invention to achieve the homogeneous blending and retention of components in suspension, as long as the emulsifier or homogenizer is capable of microparticulating the fiber in accordance with the present invention to an average fiber particle size of less than about 50 microns and more preferably about 10 microns to about 50 microns and most preferably less than about 20 microns. When a homogenizer is used, this aspect of treating the first diluted mixture preferably comprises homogenizing the mixture through the first stage of the homogenizer at a pressure of about 500 psi (3.15 kg/cm$^2$) to about 750 psi (52.73 kg/cm$^2$) and a pressure of about 1000 psi (70.3 kg/cm$^2$) to about 1500 psi (105.45 kg/cm$^2$) in the second stage.

Mixing or processing in a high shear mixer or homogenizer further hydrates the fiber and creates a substantially completely homogeneous first diluted mixture whereby the fiber is essentially microparticulated and suspended generally uniformly throughout the first diluted mixture. At this point, hydrocolloid is preferably added to the first diluted mixture in an amount sufficient to prevent aggregation and retain the microparticulated fiber suspended uniformly throughout the first diluted mixture when the first diluted mixture is further diluted to form a second, more diluted mixture of predetermined consistency, such as that of the finished edible compositions discussed below. The hydrocolloid interacts with the microparticulated fiber to keep the fiber suspended for a considerable time sufficient to provide an appealing visual appearance to consumers after shipping, storage and, where prepackaged, shelf display of the compositions.

Where desired, the fruit and/or vegetable juices and sweeteners are then blended into the first diluted mixture using a low speed mixer while preferably maintaining the temperature of the first diluted mixture above the gelatinization temperature of the fiber, although these ingredients may be added at a later stage.

The first diluted mixture is again processed or mixed, preferably in a homogenizer or high shear mixer, for a period of time sufficient to substantially completely hydrate the hydrocolloid and homogenize the mixture. It is presently preferred that a homogenizer is used for this treatment, where the first diluted mixture is treated at a pressure of about 1000 psi (70.3 kg/cm$^2$) to about 1500 psi (105.45 kg/cm$^2$) in the first stage and at a pressure of about 2500 psi (175.75 kg/cm$^2$) to about 3000 psi (210.9 kg/cm$^2$) in the second stage.

Where carrageenan is the hydrocolloid used in accordance with the method of the present invention, it is presently preferred to adjust the pH of the first diluted mixture prior to and sufficient to avoid gelatinization of the mixture where a pudding-like consistency is not desired. In addition, the mixture is preferably acidified sufficiently to adjust the flavor of the edible product to a desired tartness. Citric acid is the presently preferred potable acid or acidifying agent where carrageenan is used because citric acid reacts with any potassium in the mixture to form potassium citrate, thus avoiding undesirable gelling reactions between carrageenan and potassium. It is presently preferred to adjust the pH of the first diluted mixture to no higher than about 5.5 to avoid gelatinization and no lower than about 3.5 to avoid an edible composition that is too acidic or tart to the taste. Except in the case of puddings, where pH at a level to avoid gelatinization is not important, the edible composition made from the first diluted mixture should have a pH range of about 3.5 to about 5.5. A pH of about 3.8 is presently preferred. In addition, where carrageenan is the hydrocolloid used in accordance with the present method, the addition of a mono- or disaccharide to the first diluted mixture assists in arresting the gelatinization of the mixture.

At about the same time that the potable acid is added, any desired syrups and flavorings are also blended into the first diluted mixture using a low speed mixer.

After the edible product has been processed in accordance with the method of the present invention, additional liquid may be added to achieve the volume desired for a particular edible composition, such as a beverage, a frozen confection or a pudding, for example. Alternatively, it may be desired to aseptically package the edible product without alteration as a composition concentrate for use in preparing edible compositions at a later time. Further, it may be desired to partially or substantially completely dehydrate the edible product to form a high concentrated edible product for later use in forming edible compositions as desired. Dehydration of the edible product may be conducted using known techniques for dehydrating, such as spray drying, pan drying and drum or roller drying. Because these drying techniques are well-known to those skilled in the art, it is not necessary to detail them here.

Once partially or completely dehydrated, an edible composition can be prepared from the edible product by adding liquid, preferably water, to a predetermined desired volume with mixing or further processing, depending on the type of edible composition desired. For example, where it is desired to prepare a beverage from a partially or completely dehydrated edible product, liquid is added to a predetermined volume with mixing of the liquid and edible product mixture sufficient to yield a relatively homogeneous beverage mixture. Where a frozen confection is desired, the partially or completely dehydrated edible product or the edible product further diluted to the desired volume may be processed using conventional techniques and apparatus for converting the liquid mixture (the edible product) to a frozen confection, such as a hard-packed or soft-serve frozen confection product using conventional techniques, including conventional processing techniques and equipment typically used to make ice cream, sherbet, frozen custard or frozen yogurt, for example.

Similarly, where an edible composition having a pudding-like consistency is desired, the edible product of the present invention, preferably prepared without acidification at least until after gelatinization has occurred, may be made typically by adding starch and/or milk solids. Again, the usual processing techniques and equipment well-known to those skilled in the food processing art, may be used, and need not be described in detail herein.

The edible product or edible composition may be processed through an aseptic system, preferably within about 30 minutes to provide an edible product or composition with a stable shelf life of at least six months when stored at about 70° F. (21.1° C.) in accordance with Food and Drug Administration (FDA) guidelines. Alternatively, edible products and compositions of the present invention may be packaged for cold storage, such as the refrigerated or dairy sections of supermarkets, for at least twenty days in accordance with FDA guidelines.

The edible composition or product is aseptically treated by heating to at least 190° F. (87.8° C.) and preferably to a temperature of about 200° F. (93.3° C.) for a period of about 1.5 minutes to about 3 minutes. Where an edible composition or product is prepared with a pH equal to or greater than about 4.4 generally higher processing temperatures (about 280° F. to about 290° F., (137.8° C.–143.3° C.)) are preferred in accordance with well-known FDA guidelines. A plate-and-frame heat exchanger may be used to aseptically process the edible product and compositions of the present invention, although one skilled in the art will appreciate that other heating methods and apparatus may be used for this purpose.

The edible product or composition is then cooled to a temperature of less than about 100° F. (38° C.) for packaging in any desired type of container, aseptic shelf-stable juice boxes or glass bottles, for example, with respect to beverages using aseptic techniques and apparatus well-known to those skilled in the art.

The present invention will now be illustrated in further detail with reference to the following specific, non-limiting examples.

Example 1

Using the method of the present invention, a beverage was prepared with the following ingredients set forth in Table 1:

TABLE 1

Berry Flavored Beverage

| Ingredient | Percent Total Beverage |
| --- | --- |
| Barley Flour | 1.93 |
| Brown Rice Flour | 0.70 |
| Oat Flour | 0.70 |
| Corn Flour | 0.18 |
| Carrageenan | 0.20 |
| Apple Concentrate (1:6.50) | 1.00 |
| White Grape Concentrate (1:5) | 0.88 |
| Pear Concentrate (1:6.50) | 0.30 |
| Citric Acid | 0.24 |
| Natural Fruit Enhancer 102 Flavoring (from American Fruit Processors, Pacoima, CA (AFP)) | 1.47 |
| DS Cherry WONF 30:1 Flavoring (AFP) | 1.00 |
| Natural Berry WONF E90325 Flavoring (from Mane U.S.A., Wayne, NJ (Mane)) | 0.10 |
| Natural Berry WONF E90326 Flavoring (Mane) | 0.05 |
| Rice Syrup | 12.82 |

TABLE 1-continued

Berry Flavored Beverage

| Ingredient | Percent Total Beverage |
| --- | --- |
| Water | remainder |

With reference to the ingredients in Table 1, ⅓ of the total amount of water was added as cold water to a mixing vessel equipped with a low speed mixer. The grain (barley, brown rice, oat and corn) flours were slowly blended with the water in the mixing vessel and the mixture was heated to 150° F. (65.6° C.). Mixing continued during the heating phase to prevent settling and scorching of the grains. During the heating phase, hot water at approximately the same temperature was added to about 80% of the total volume of water in the final beverage composition.

The grain and water mixture was then processed through the first stage of a Gaulin Homogenizer at 500 psi (35.15 kg/cm$^2$) and then through the second stage at 1500 psi (105.45 kg/cm$^2$) to microparticulate the grains. The homogenized mixture was returned to the mixing vessel with the low speed mixer and carrageenan was added to the mixture through an eductor to minimize clumping. The apple, white grape and pear juice concentrates were then blended into the mixture, where the temperature was maintained at 150° F. (65.6° C.).

When the mixture was fully blended, it was again passed through the Gaulin Homogenizer, through the first stage at 750 psi (52.73 kg/cm$^2$) and through the second stage at 3000 psi (210.9 kg/cm2). The re-homogenized mixture was again returned to the mixing vessel with the low speed mixer.

The citric acid was added along with the natural fruit enhancer flavoring, as well as the natural apple, pear and peach flavorings. Blending of the rice syrup followed.

After these ingredients were thoroughly blended in the mixture, the balance of water was added at 150° F. (65.6° C.) to bring the concentration of the beverage to the desired consistency. Mixing continued for 12 minutes. Thereafter, the mixture was processed through an aseptic system, heated to 200° F. (93.3° C.), packaged into clean clear glass bottles, capped and inverted for 3 minutes prior to cooling in a cold water bath to a temperature of less than about 100° F. (37.8° C.). The completed beverage composition had a pH of 3.8 with 18° Brix.

Other beverage compositions according to the present invention having the components set forth in the following Tables 2 and 3 were prepared according to the procedures described above with respect to Example 1.

TABLE 2

Grape Flavored Beverage

| Ingredient | Percent Total Beverage |
| --- | --- |
| Barley Flour | 1.93 |
| Brown Rice Flour | 0.70 |
| Oat Flour | 0.70 |
| Corn Flour | 0.18 |
| Carrageenan | 0.20 |
| Concord Grape Concentrate (1:5) | 2.50 |
| Citric Acid | 0.12 |
| Natural Fruit Enhancer 102 Flavoring (AFP) | 1.00 |

TABLE 2-continued

Grape Flavored Beverage

| Ingredient | Percent Total Beverage |
|---|---|
| Natural Grape WONF 198934 Flavoring (from Fries & Fries, Cincinnati, OH (F&F)) | 0.03 |
| Natural Grape WONF 198933 Flavoring (F&F) | 0.02 |
| Rice Syrup | 12.82 |
| Water | remaining |

TABLE 3

Maple Flavored Beverage

| Ingredient | Percent Total Beverage |
|---|---|
| Barley Flour | 1.93 |
| Brown Rice Flour | 0.70 |
| oat Flour | 0.70 |
| Corn Flour | 0.18 |
| Carrageenan | 0.20 |
| Apple Concentrate (1:6.50) | 1.00 |
| White Grape Concentrate (1:5) | 0.88 |
| Pear Concentrate (1:6.50) | 0.30 |
| Citric Acid | 0.12 |
| Natural Fruit Enhancer 102 Flavoring (AFP) | 1.47 |
| Natural Maple WONF 200835 Flavoring (F&F) | 0.21 |
| Natural Maple WONF 200836 Flavoring (F&F) | 0.90 |
| Rice Syrup | 10.70 |
| Maple Syrup | 2.50 |
| Water | remaining |

The beverage compositions disclosed in Tables 1 through 3 and prepared in accordance with the procedures of Example 1 were shelf-stable (that is, did not objectionably settle or separate and remained palatable) after at least two months storage at about 40° F. (4.4° C.) without aseptic packaging.

The present invention may be embodied in other specific forms without departing from the spirit or essential attributes thereof and, accordingly, reference should be made to the appended claims, rather than to the foregoing specification as indicating the scope of the invention.

We claim:

1. An edible product for use as a component of a shelf-stable composition comprising an aqueous suspension of the edible product, the edible product comprising a microparticulated dietary fiber derived from a dietary fiber source selected from the group consisting of a grain and a vegetable, the fiber having an insoluble fiber content of at least about 2.5 percent by weight of the dietary fiber source, and hydrocolloid in an amount sufficient to maintain the fiber in suspension in the edible composition.

2. The edible product according to claim 1, wherein the dietary fiber source has a ratio of soluble fiber to insoluble fiber of no less than about 1:9.

3. The edible product according to claim 1, wherein the microparticulated fiber has an average particle size of less than about 50 microns.

4. The edible product according to claim 1, wherein the dietary fiber source is grain.

5. The edible product according to claim 4, wherein the grain is whole grain.

6. The edible product according to claim 5, wherein the whole grain is organically grown whole grain.

7. The edible product according to claim 6, wherein the grain is selected from the group consisting of barley, brown rice, oats, corn and malts thereof.

8. The edible product according to claim 1, wherein the dietary fiber source is vegetable fiber having an insoluble fiber content of at least about 25% by weight of the dietary fiber source.

9. The edible product according to claim 1, wherein the hydrocolloid is present in an amount sufficient to yield about 0.05% to about 1.00% hydrocolloid in the edible composition.

10. The edible product according to claim 1, wherein the hydrocolloid is selected from the group consisting of carrageenan, cellulose gum, guar gum, locust bean gum, alginate and pectin.

11. The edible product according to claim 10, wherein the hydrocolloid is carrageenan present in an amount sufficient to yield about 0.20% carrageenan in the edible composition.

12. The edible product according to claim 1, further comprising fruit juice in an amount sufficient to flavor the edible product with fruit juice flavor.

13. The edible product according to claim 12, wherein the fruit juice is present in an amount sufficient to yield up to about 20% fruit juice in the edible composition.

14. The edible product according to claim 13, wherein the fruit juice is selected from the group consisting of apple, grape, cherry and pear juice and mixtures thereof.

15. The edible product according to claim 1, further comprising vegetable juice.

16. The edible product according to claim 1, further comprising a sweetener in an amount sufficient to sweeten the edible composition.

17. The edible product according to claim 16, wherein the sweetener is selected from the group consisting of natural syrups, sugars and non-nutritive sweeteners.

18. The edible product according to claim 17, wherein the sweetener is a natural syrup sweetener present in an amount sufficient to yield about 5% to about 20% sweetener in the edible composition.

19. The edible product according to claim 1, further comprising additional flavoring.

20. The edible product according to claim 19, wherein the additional flavoring is selected from natural flavors selected from the group consisting of apple, pear, peach, cherry, mixed berry, grape, maple and chocolate flavoring.

21. A shelf-stable edible composition comprising the edible product according to claim 1, wherein the fiber is present in an amount sufficient to yield at least about 0.025% insoluble fiber in the edible composition.

22. A shelf-stable edible composition comprising the edible product according to claim 1, wherein the edible composition is a pudding.

23. A shelf-stable edible composition comprising the edible product according to claim 1 and sufficient liquid to render the edible composition palatable to a consumer of the edible composition.

24. The edible composition according to claim 23, wherein the edible composition is a frozen confection.

25. The edible composition according to claim 23, further comprising starch.

26. The edible composition according to claim 23, further comprising milk solids.

27. An edible composition comprising a shelf-stable aqueous suspension of a microparticulated grain, natural sweetener in an amount sufficient to sweeten the edible composition, hydrocolloid in an amount sufficient to maintain the grain in suspension in the aqueous suspension, the grain being present in an amount sufficient to yield about 1% to about 10% grain in the edible composition and fruit juice in an amount sufficient to flavor the edible composition with fruit juice.

28. The edible composition according to claim 27, wherein the grain is whole grain.

29. The edible composition according to claim 28, wherein the whole grain is organically grown whole grain.

30. The edible composition according to claim 27, wherein the natural sweetener is a natural syrup present in an amount sufficient to yield about 5% to about 20% sweetener in the edible composition, and wherein the hydrocolloid is present in an amount sufficient to yield about 0.05% to about 1.00% hydrocolloid in the edible composition.

31. The edible composition according to claim 30, wherein the grain is selected from the group consisting of barley, brown rice, oats, corn and malts thereof, and is present in an amount sufficient to yield about 3.5% grain in the edible composition, the fruit juice is selected from the group consisting of apple, grape, cherry and pear fruit juice, the fruit juice being present in an amount sufficient to yield about 10% to about 20% fruit juice in the edible composition, the sweetener is selected from the group consisting of organic rice syrup and organic maple syrup, the natural syrup being present in an amount sufficient to yield about 10% to about 15% sweetener in the edible composition, the hydrocolloid is selected from the group consisting of carrageenan, cellulose gum, guar gum and pectin, and an additional flavoring selected from the group consisting of apple, pear, peach, cherry, mixed berry, grape and maple flavoring, the additional flavoring being present in an amount sufficient to yield about 0.1% to about 0.2% flavoring in the edible composition.

32. The edible composition of claim 23 wherein the composition has smooth mouth feel.

\* \* \* \* \*